United States Patent [19]
MacLaren

[11] Patent Number: 5,702,079
[45] Date of Patent: Dec. 30, 1997

[54] BAT MEDIA SUPPORT FRAME APPARATUS AND METHOD

[75] Inventor: David S. MacLaren, Gates Mills, Ohio

[73] Assignee: Jet Inc., Cleveland, Ohio

[21] Appl. No.: 476,696

[22] Filed: Jun. 7, 1995

[51] Int. Cl.⁶ ................................................. A47D 19/04
[52] U.S. Cl. ........................................................ 248/127
[58] Field of Search .................................. 248/127, 146, 248/175; 211/182, 189; 210/150

[56] References Cited

U.S. PATENT DOCUMENTS

| | | | |
|---|---|---|---|
| 1,477,894 | 12/1923 | Perry . | |
| 2,923,542 | 2/1960 | Clark et al. | 248/127 X |
| 3,221,894 | 12/1965 | Knuth | 211/182 X |
| 3,231,490 | 1/1966 | Fry | 210/17 |
| 3,232,865 | 2/1966 | Quinn et al. | 210/11 |
| 3,301,401 | 1/1967 | Hall | 210/150 |
| 3,617,541 | 11/1971 | Tai Pan | 210/17 |
| 3,858,318 | 1/1975 | Muto et al. | 29/433 |
| 3,912,086 | 10/1975 | De Bruyn | 211/182 X |
| 3,962,087 | 6/1976 | Hartmann | 210/150 |
| 4,137,171 | 1/1979 | Yokata | 210/150 |
| 4,149,972 | 4/1979 | Iwai et al. | 210/150 |
| 4,165,281 | 8/1979 | Kuryama et al. | 210/17 |
| 4,177,147 | 12/1979 | Roberts | 210/151 |
| 4,267,051 | 5/1981 | Uhlmann | 210/619 |
| 4,333,893 | 6/1982 | Clyde | 261/94 |
| 4,345,997 | 8/1982 | McConnell, Jr, et al. | 210/150 |
| 4,416,993 | 11/1983 | McKeown | 435/243 |
| 4,599,167 | 7/1986 | Benjes et al. | 210/150 |
| 4,623,454 | 11/1986 | Tauscher et al. | 210/150 |
| 4,634,534 | 1/1987 | Cominetta et al. | 210/150 |
| 4,658,560 | 4/1987 | Beaulieu | 211/182 X |
| 4,666,593 | 5/1987 | Bosne | 210/150 |
| 4,810,377 | 3/1989 | Kato et al. | 210/150 |
| 4,822,015 | 4/1989 | Glasman et al. | 269/54.1 |
| 4,859,321 | 8/1989 | Iida | 210/150 |
| 5,073,256 | 12/1991 | Sieksmeyer et al. | 210/151 |
| 5,089,137 | 2/1992 | McKown | 210/615 |
| 5,122,266 | 6/1992 | Kent | 210/150 |
| 5,144,873 | 9/1992 | Nasu | 83/19 |
| 5,257,794 | 11/1993 | Nakamura | 211/182 X |
| 5,377,849 | 1/1995 | Martin | 211/182 X |
| 5,430,925 | 7/1995 | MacLaren | 29/433 |

*Primary Examiner*—Ramon O. Ramirez
*Attorney, Agent, or Firm*—Roberts & Brownell

[57] ABSTRACT

An apparatus and method for cleaning, inspecting and maintaining media disposed within a biological aeration treatment media support frame. The apparatus consists of a frame connected to legs, x shaped cross-members, lifting hooks, lock bar supports and lock bars. The x shaped cross-members are mounted to the sides and bottom of the frame for the support of media as well as contributing to the strength of the frame thus protecting it from external forces. The lifting hooks permit the operator of the biological aeration treatment support frame to remove the frame in an effortless manner when cleaning, maintaining and inspecting the media. The lock bars are supported by the lock bar supports, which, in turn, maintain the media within the frame hence not allowing the media to float around in the wastewater treatment compartment. The lock bar support handle can also be used as a lifting hook. The lock bars are swivel mounted on the lock bar support to allow easy access to the media. This access will allow the operator to easily remove the media from the frame for cleaning, maintaining or inspecting the media when the removal of the entire apparatus is not required.

29 Claims, 6 Drawing Sheets

BAT MEDIA SUPPORT FRAME APPARATUS AND METHOD

FIELD OF THE INVENTION

The present invention relates generally to a Biologically Accelerated Treatment (BAT) media support frame apparatus used to contain biofilm support media for the treatment of wastewater. In particular, the present invention is directed toward a support frame which allows fast and efficient periodic media cleaning so as to maintain high treatment efficiencies and lower costs associated with periodic media cleaning as compared with currently used techniques.

BACKGROUND AND DESCRIPTION OF THE RELATED ART

It has become increasingly important to treat wastewater in an efficient manner so as to protect the health and well being of humankind. In past years the treatment of wastewater has advanced considerably to include the use of chemical and biological agents. In this light it has become common practice to treat wastewater with biologically active organisms that digest, and thus, eliminate organic material from wastewater. These biologically active organisms grow as a biofilm on media which act as carriers for the biologically active organisms. It is common practice to mount the media onto a supporting structure and submerge the supporting structure into the flow path of wastewater for treatment therein. The biofilm continues to grow overtime as it ingests organic material from the wastewater. The biofilm eventually proliferates to the extent that it hinders passage of wastewater through the biofilm media. Therefore, the need to clean the media in an efficient manner becomes critical. Unfortunately, the cleaning of media has not followed the same advancement as the treatment of the wastewater. To this extent many media support structure designs make it difficult to clean the media outside the treatment compartment or tank. In many instances these inadequacies will lead to inefficient wastewater treatment processes. Thus, there is a definite need for a media supporting apparatus that will allow the operator of a treatment facility to efficiently and easily clean, maintain and, if necessary remove, the media from the treatment compartment or tank.

Media supporting structures have been known and used in the treatment of wastewater for many years. Currently used supporting structures, however, have several shortcomings that are difficult to overcome, and in many instances can be a hindrance, when treating wastewater. These shortcomings lead to problems which range from difficulty in cleaning the media to the inability to vary the size of the supporting structures for various wastewater treatment applications.

Specifically, supporting structures which are currently utilized in the field do not lend themselves to easy reconfiguration of their sizes hence allowing only a definitive amount of media to be mounted thereon during wastewater treatment. These supporting structure configurations do not lend themselves to the adaptability and diversity needed in facilities ranging from small-sized home plants to middle-sized commercial tanks to large municipal wastewater treatment plants. In particular, sections of supporting structures cannot be varied in size to accommodate, amongst other applications, differing sizes of media so as to allow the positioning of media into small openings within areas of a tank for the treatment of wastewater. For example, U.S. Pat. No. 4,149,972 to Iwai et al. discloses a wastewater apparatus which comprises thin fan-shaped media sheets which are assembled using spacers. A tubular member is then inserted through holes in the media sheets to form an assembly of sheets. The assembly of sheets is radially disposed about a shaft which, in turn, forms a circular rotary body. In this embodiment the design does not allow for varying sizes of the media sheets and thus the assembly of sheets is fixed in size, thereby creating the inability to position the assembly of sheets in small areas that would otherwise accumulate wastewater.

A further example of a supporting means that does not allow for variation in size is U.S. Pat. No. 4,810,377 to Kato et al. which discloses a clarification device in which media is disposed in an upward direction from the bottom of a purifier tank. The biofilm media are divided into a plurality of assemblies to simplify removal from the purifier tank. The purifier tank has a top opening which accommodates several covers. In this configuration the purifier tank can only accommodate specific amounts of media for the treatment of wastewater. Additionally, the purifier tank is unable to be varied in size, thus not allowing the assembly to be positioned in smaller treatment compartments or tanks.

A further shortcoming of currently used supporting structures is the inability to maintain and clean the media at periodic intervals without incurring large expenditures of time and labor. In this regard, supporting structures are designed so as to make it difficult to periodically maintain and clean the media. Specifically, referring once again to the Iwai et al, reference, it is difficult to disassemble the apparatus so as to thoroughly maintain and clean the media sheets. To remove and thoroughly clean the media sheets the structure must be removed from the wastewater, completely disassembled, cleaned, reassembled and reintroduced to the wastewater. This procedure, and more particularly the disassembling of media sheets, spacers and tubular members, is time consuming, laborious, and inefficient.

Additional weaknesses in the currently used supporting structures include the lack of structural strength of media against external forces when mounted on the supporting structures. To this extent currently used supporting structures predispose the media to design criteria that render the media incapable of withstanding external forces. Generally, these design criteria force the media to be designed in thin sheets that are incapable of sustaining vertical and horizontal external forces. These supporting structures are varied in design and account for the majority of designs in the field.

Other systems using media support frames include those disclosed in U.S. Pat. Nos. 3,231,490 to Fry; 3,301,401 to Hall; 3,617,541 to Pan; 3,962,087 to Hartmann; 4,137,171 to Yokata; 4,165,281 to Kuriyama, et al.; 4,177,147 to Roberts; 4,267,051 to Uhlmann; 4,333,893 to Clyde; 4,416,993 to Benjes, et al.; 4,859,321 to Iida; and, 5,073,256 to Sieksmeyer, et al. These media support structures also suffer from the same shortcomings as described above.

Therefore, in light of the above shortcomings a new media support frame structure is needed which would be capable of easily varying its size to accommodate various wastewater plant applications and which would allow easy periodic cleaning, inspection, and maintenance. The new media support frame apparatus would also accommodate various sizes, configurations, and designs of media that can withstand external forces. U.S. Pat. No. 5,388,316 to MacLaren discloses media sheets bound together by tubes. This patent presents a novel method of cleaning the media and is incorporated herein by reference.

SUMMARY OF THE INVENTION

It is therefore an object of the present invention to provide a BAT media support frame that may be easily placed at any location in a treatment compartment or tank.

It is a further object of the present invention to provide a BAT media support frame that can be quickly and easily configured to fit into any treatment compartment or tank by fitting a number of frames horizontally or vertically and then locking them together by simple locking devices.

It is still a further object of the present invention to provide a BAT media support frame that can be easily removed from the treatment compartment or tank by lifting hooks.

It is yet a further object of the present invention to provide a BAT media support frame that allows media to be designed to withstand external forces.

It is another object of the present invention to provide a BAT media support frame that will allow media to be easily placed therein and removed.

It is still another object of the present invention to provide a BAT media support frame that will allow media blocks to be kept at varying depths in the BAT media support frame.

It is yet another object of the present invention to provide a BAT media support frame that will accommodate varying sizes of media blocks.

It is an additional object of the present invention to provide a BAT media support frame that prevents media in the BAT media support frame from floating in the treatment compartment or tank.

It is still an additional object of the present invention to provide a BAT media support frame that allows the media to be easily cleaned.

It is yet an additional object of the present invention to provide a BAT media support frame that can be easily replaced in the wastewater treatment compartment or tank.

These and other objects and advantages of the present invention will be apparent to those persons skilled in the art upon examination of the detailed description of the invention, the drawing figures, and the appended claims.

The present invention comprises a frame which may include legs, lock bars, snap locks, lock bar supports, lifting hooks, and cross-members. The inclusion and number of the above components will be determined by the size and shape of the frame. The media support frame can be designed to fit the dimensions of any treatment compartment or tank. In furtherance of this concept, the media support frame will be able to accommodate any location of a treatment compartment or tank by varying its dimensions, placing the media support frames side by side and/or stacking them in a vertical position. The latter two scenarios would be accomplished by utilizing locking devices to connect support frames in the stacked and/or side by side positions. In some applications, such as in high pressure head flows, the media support frames will be fixed to the walls in the treatment compartment or tank by the locking devices. In light of the above, it will now be possible to place the media support frame or frames in any treatment compartment or tank for maximum utilization.

Subsequent to the configuring of the media support frame, media will be placed therein. The media will be loaded until it reaches a certain depth in relation to the media support frame and will be preferably supported by at least one cross-member located at the bottom and each side of the frame. The configuration of the frame allows the media to be stacked in a vertical or a horizontal manner as well as accommodating media of different sizes. As mentioned earlier, the number of cross-members will be determined by the size of the frame—a larger dimension frame will require more cross-members. Lock bars or other restraint devices will then be positioned over the media to prevent the media from floating in the treatment compartment or tank. Thereafter, the supporting frame and media will be lowered into the treatment compartment or tank, preferably by lifting hooks. The lifting hooks will also allow easy removal of the supporting frame and media for periodic inspection, maintenance, and cleaning.

After a certain period of operation, the operator may have to clean the media that is located in the supporting frame. To accomplish this periodic cleaning the operator may utilize one of the following four techniques:

1. Pump the mixed liquor out of the treatment vessel and wash the media by spraying it with water;

2. Use air bubbles to wash down the biofilm and pump the settled biofilm to another treatment unit;

3. Use the pump cycle to force the biofilm to drip down from the media surface using the gravity method and pump the settled biofilm to another treatment unit; or 4. Remove the media blocks from the treatment compartment or tank, either with or without the frame, and wash the media outside of the treatment compartment or tank.

The latter method will usually be utilized in smaller covered plants; however, it may be effectuated at any size plant which is covered or not covered.

To effectuate technique number four it will be necessary to initiate the following cleaning procedures:

a. Open the lock bar;

b. Remove the media from the supporting frame and hence the treatment compartment or tank;

c. Clean the media in a unit;

d. Reload the media into the media supporting frame; and e. Lock the lock bar.

This method of cleaning can vary slightly for other applications including, amongst other applications, small and large covered plants as well as small and large non covered plants. This variation will include lifting the entire media support frame from the treatment compartment or tank prior to the removal of the media from the frame. After the media is cleaned as referenced in steps a through e, the entire media support frame will be submerged into the treatment compartment or tank. The lifting of the media support frame and the subsequent submerging of the same into the treatment compartment or tank will be accomplished by the use of the lifting hooks. Another variation includes lifting the entire media support frame from the treatment compartment or tank and cleaning the media while it is disposed within the support frame. It is preferred to use these latter methods in smaller plants that are not covered or a larger plants that are not covered.

DETAILED DESCRIPTION OF THE INVENTION

The detailed description of the present invention is based on a free standing BAT media support frame (hereinafter referred to as a "media support frame") for use in a home wastewater treatment compartment or tank (hereinafter referred to as a "treatment plant") which is designed to process 500 gallons of fluid a day. All numbers and dimensions that are used in this description are based on a free standing media system that can accommodate such a treatment plant while utilizing at least eight media blocks. The dimensions of the media support frame, including legs, lock bars, snap locks, lock bar supports, lifting hooks, cross-members, elbows, tee connectors, pipes, and other dimensions and quantities specified may vary with the size and type of treatment plant contemplated for use with the present invention. Therefore, numbers and dimensions specified herein are not to be construed as limitations on the scope of the present invention but are meant to be merely illustrative of one particular application. For example, it is contemplated that the components of the media support frame may be assembled in different quantities and arrangements so as to accommodate any size and shape of wastewater treatment tank or plant. Further, more than one frame may be combined to form an array of neighboring frames, if appropriate.

Figure 1:
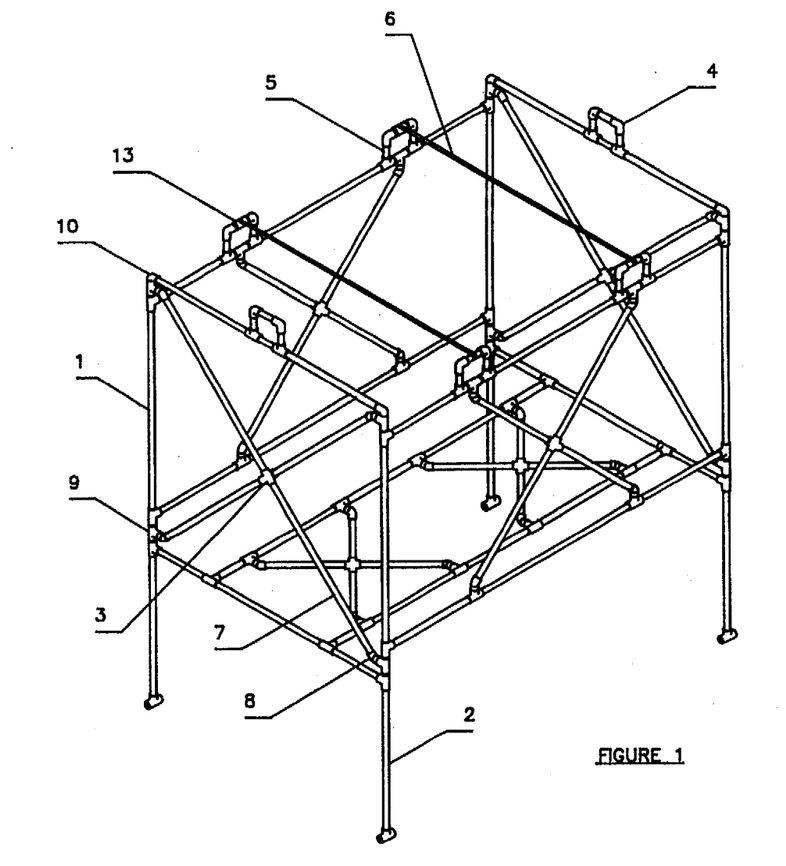
FIG. 1 is an isometric diagram of the BAT media support frame.

FIG. 1 demonstrates a free standing media support frame which will be utilized in a home treatment plant. In the preferred embodiment the frame 1 is assembled using segments of pipe 7 which are preferably constructed from a lightweight, non-rusting material such as PVC. The segments of pipe 7 on the frame 1 form a top, a bottom, ends, and sides which, in turn, form a polyhedron shape. The shape of the frame 1 and the quantity of frames used will depend on the configurations and dimensions of the specific treatment plant; however, in the preferred embodiment the top, bottom, ends, and sides of the frame 1 will have a rectangular shape. The top, bottom, ends, and sides of the frame 1 are connected together by various coupling devices.

In the preferred embodiment as depicted in FIG. 1 the top, bottom, two ends, two sides, and legs are connected by several coupling devices. In the preferred embodiment the shape of the sides, ends, bottom, and top form a rectangular shape. For example, the ends are formed by pipe segments connected in a rectangular shape, with legs 2 extending downward from the bottom of the ends, as shown. The two sides are defined by pipe segments that are attached to the two ends. The bottom, two ends, and two sides are reinforced by x shaped cross-members, cross braces, or other reinforcement constructions. These reinforcement constructions hold the media in place and lend structural support to the frame against external forces. The top of the frame 1 is defined by the top pipe segments of the ends and sides. The top pipe segments of the sides are lower than the top segments of pipe of the ends, defining a step sequence wherein there is a higher portion and a lower portion. The higher portions are located at the top pipe segments of the ends and the lower portions are located at the top pipe segments of the sides. The bottom of the frame 1 is defined by the bottom pipe segments of the ends and sides. The bottom pipe segments of the sides can be higher, lower, or the same height as the bottom pipe segments of the ends. All pipe segments are rigidly connected to form the frame 1. The connections are made, for example, using elbows, tee connectors, or other coupling devices.

On the higher portion of the top of frame 1 are lifting hooks 4 which are connected to segments of the pipe 7 of the frame 1. At least one lifting hook 4 will be placed on each higher portion of the top of the frame 1 to facilitate the simple removal of the frame 1 from the treatment plant for the periodic cleaning, maintenance, and inspection of media blocks. The above configuration of lifting hooks 4 are preferred; however, in alternative embodiments any number or configuration of lifting hooks 4 or other graspable implements that facilitate the lifting of the media support frame will suffice. Thus, due to the flexibility in the shape and number of the elements of the present embodiment, the frame 1 can be easily located in any portion of a treatment tank for high efficiency.

FIG. 1 further shows lock bar supports 5 on the top of the frame 1. In the preferred embodiment two lock bar supports 5 will be mounted on each lower portion of the top of the frame 1 by tee connectors 9. In alternative embodiments, the lock bar supports 5 may be placed at other locations of the frame 1. The lock bars 6 are employed to prevent the media block from floating in the treatment plant as well as to keep the media block at a certain depth in the frame 1. The operator of the treatment plant may also utilize the lock bar supports 5 as lifting handles when the necessity arises, such as when the configuration of frame 1 forecloses the isolated use of the lifting handles 5. The lock bar 6 is coupled to each lock bar support 5 by hinges 13. The lock bar 6 may also be coupled to any portion of the frame 1 depending on the convenience and practicality for the particular application. The hinges 13 allow the user to easily move the lock bars 6 so as to obtain simple access to the media block within the frame 1. Other movable restraining devices may be used with or in place of the disclosed lock bars. Note that the quantity of the above components used will be determined by the size and application of the frame 1. In light of the above embodiment, the reduction in labor, costs, and time associated with cleaning, maintenance, and inspection will be substantially reduced.

It is also seen from FIG. 1 that the cross-members 3 are coupled to the sides, ends, and bottom of the frame 1. The cross-members 3, in conjunction with the lock bars 6, are designed to hold the media block in the frame 1. It is preferable to assemble the cross-members in an x configuration; however, any pattern that retains the media block within the frame 1 will be acceptable. In the preferred embodiment the cross-members 3 are attached to the to the frame 1 by, for example elbows 8 and the tee connectors 9. In the present illustration one cross-member 3 will be placed on each side and end of the frame 1 and two cross-members 3 will be placed on the bottom of the frame 1. In the preferred embodiment, the cross-members 3 are constructed from the pipe 7 similar to the rest of the frame 1. The number and placement of the cross-members 3, the tee connectors 9, and the elbows 8 will vary according to the dimensions and application of the frame 1.

Figure 2:
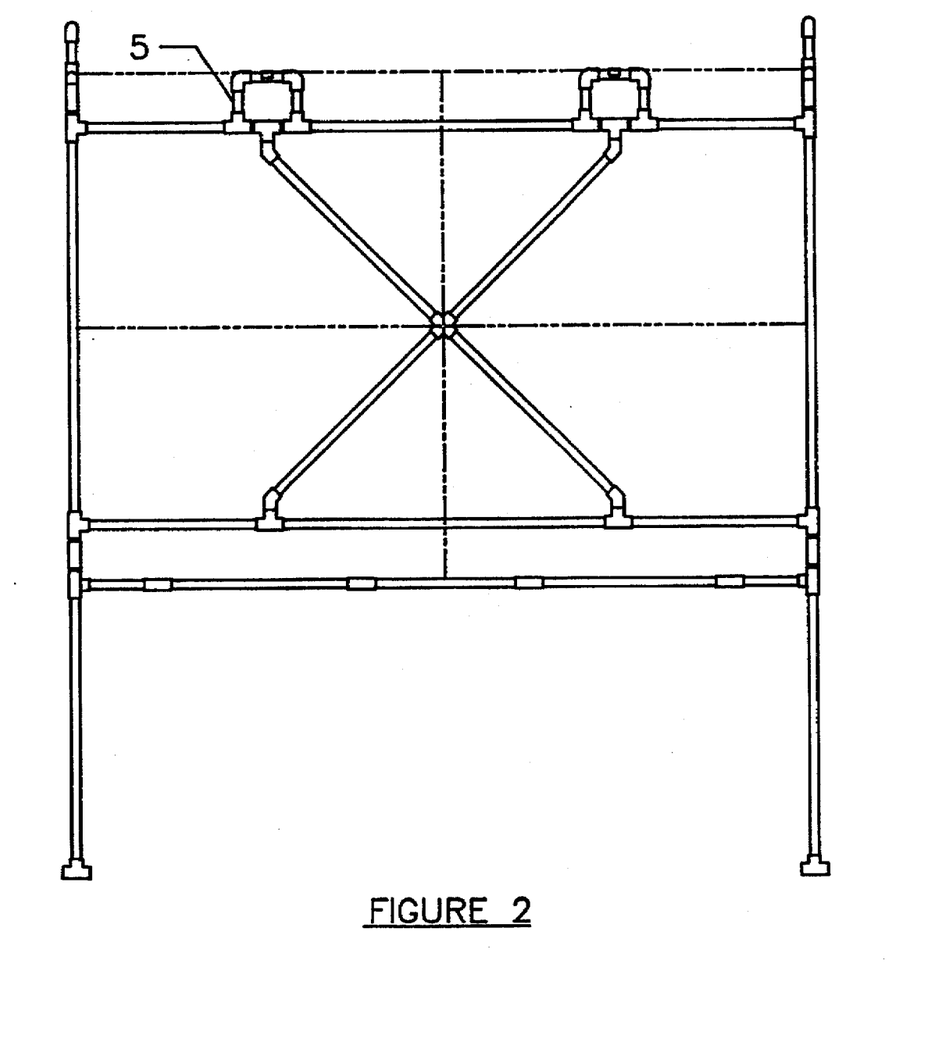
FIG. 2 is a side view diagram of the BAT media support frame.

FIG. 2 illustrates a side view of the frame 1 with several media blocks 11 disposed therein. The frame 1 is designed to support the media blocks 11 of varying sizes and in varying combinations. These combinations may include arrangements of small blocks or orderly stacked blocks. Media blocks 11 are supported in the frame 1 by the cross-members 3 on the bottom, ends, sides, and at least one lock bar 6. At least one cross-members 3 will be located at each side, end, and bottom of the frame 1. It is preferred that the media blocks 11 be stacked to the same height as the lock bar 6 so that the media blocks 11 will be securely dispensed within the frame 1. The above configuration will prevent the media blocks 11 from floating within the treatment plant thus achieving maximum efficiency.

Figure 3:
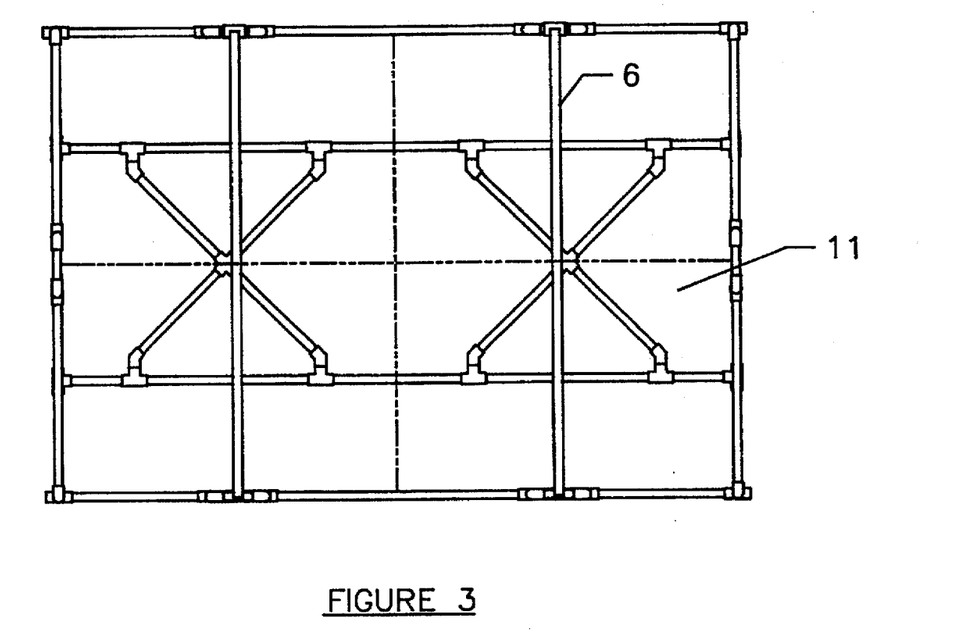
FIG. 3 is a plan view diagram of the BAT media support frame.

As shown in FIG. 3 the lock bar 6 is connected to a lock bar support 5. In this portrayal the lock bars 6 are in a locked position thus securing the media blocks 11 within the frame 1. In order to properly and effectively facilitate the inspection, cleaning, or maintenance of the media block 11, the user will simply:

1. Unlock the lock bar 6;
2. Lift the media block 11 from the frame 1;
3. Clean, inspect, or maintain the media block 11;
4. Replace the media block 11 in the frame 1; and
5. Secure the lock bar 6 to the lock bar support 5 (or other portions of the frame 1 depending on the convenience and practicality for the particular application).

During this process the media support frame will remain within the wastewater treatment plant. This method will be usually be employed with small plants that are covered. If there is a large plant (or a small plant that is not covered) the user will simply:

1. Remove the media support frame from the treatment plant;
2. Unlock the lock bar 6;
3. Lift the media block 11 from the frame 1;
4. Clean, inspect, or maintain the media block 11;
5. Replace the media block 11 in the frame 1;
6. Secure the lock bar 6 to the lock bar support 5 (or other portions of the frame 1 depending on the convenience and practicality for the particular application); and
7. Replace the media support frame in the treatment plant.

In the alternative, the operator may clean, inspect, or maintain the media in the following manner:

1. Remove the media support frame from the treatment plant;
2. Clean, inspect or maintain the media block 11 within the frame 1;
3. Replace the media support frame in the treatment plant.

To accomplish the removal of the media support frame the user will lift the frame 1 by the lifting hooks 4. As stated previously, the operator of the treatment plant may also utilize the lock bar supports 5 as lifting handles when the necessity arises. Using the lock bar supports 5 as a lifting point will allow the operator simple removal of the media support frame under conditions that would make the isolated use of the lifting hooks 4 impracticable.

Figure 4:
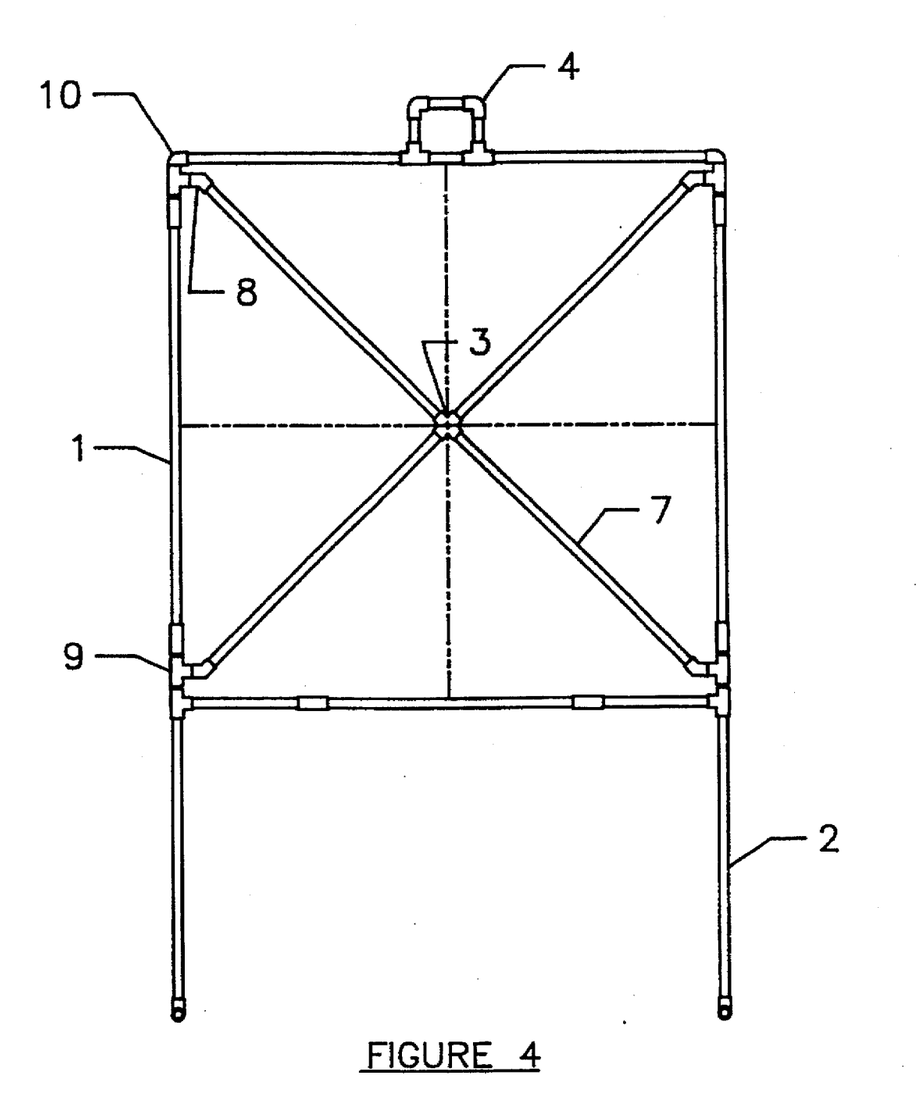
FIG. 4 is an end view diagram of the BAT media support frame.

FIG. 4 depicts the lifting hooks 4 located at the higher portion of the frame 1. The number and location of the lifting hooks 4 will vary according to the convenient and practical application of the media support frame. The variation of the lifting hooks 4 will be based on several variables including, but not limited to, the size, shape, and weight of the media support frame. The number of the lifting hooks 4 can also vary according to the number of media blocks 11—more lifting hooks 4 will be used when bulky or heavy media blocks 11 are disposed within the frame 1. FIG. 4 further depicts the location of the lifting hooks 4 so as to facilitate ease in the removal of the media support frame when cleaning, maintaining, or inspecting the media blocks 11. It is preferred, as illustrated in FIG. 4, that the cross-members 3 be connected to the tee connectors 9 by elbows 8 which in turn are coupled to the frame 1 at all corners. This configuration gives the media support frame a substantial amount of support so as to withstand external loads. The cross-members it will be manufactured from segments of pipe 7 to further strengthen frame 1.

Figure 5:
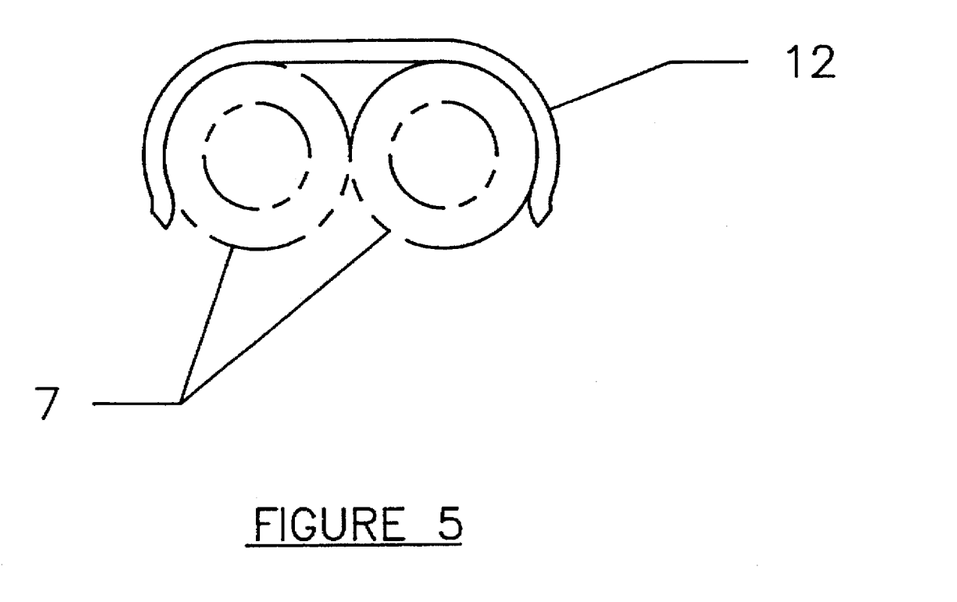
FIG. 5 is a plan view diagram of a snap lock.

As shown, FIG. 5 demonstrates a snap lock 12 connecting two pipes 7. When more than one media support frame is used in a treatment plant the snap lock 12 will connect the pipes 7 of adjoining frames 1 together securely locking them in place. The snap lock 12 can be made in several variations for locking purposes. These variations can include, amongst others, two prong tension locks, three prong tension locks, four prong tension locks, latch locks, hinged locks, lock groove locks, and any other locking device. The snap lock 12 can be utilized when the flames 1 are stacked in a vertical fashion or side by side. The frame 1 is designed to permit the snap lock 12 to connect to any portion of the pipe 7 to adjoining portions of the pipe 7 located on an adjacent frame 1. The snap lock 12 allows for further versatility of the media support frame by allowing the media support frame to accommodate any treatment plant configuration.

Figure 6:
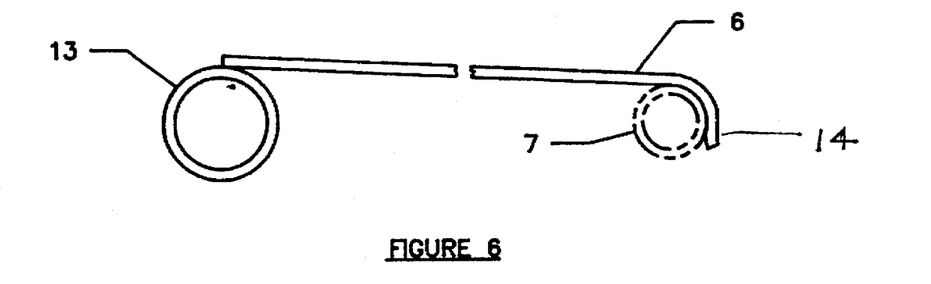
FIG. 6 is a schematic diagram of a lock bar.
Figure 7:
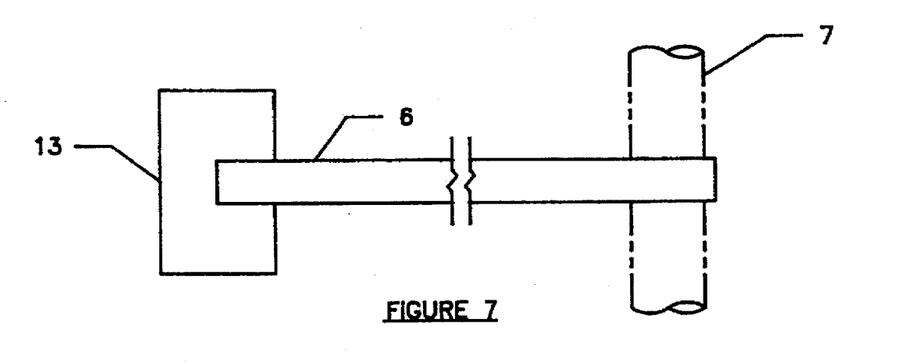
FIG. 7 is a plan view diagram of a lock bar.

As shown in FIG. 6 and FIG. 7, the lock bar 6 can be connected to the frame 1 by a hinge 13. In the preferred embodiment, the hinge is a section of tubing that fits around the frame section and is free to swivel about the frame section. It is preferred that the hinge 13 be swivel mounted on a lock bar support 5. In this configuration the lock bar 6 will have two ends. The first end of the lock bar 6 will be connected to the hinge 13 and the second end of the lock bar 6 will accommodate a latch 14 or other device for removably locking the lock bar 6 onto the pipe 7. Referring now to FIG. 7 it is noted that the hinge 13 and the latch 14 can be fashioned in different shapes and sizes. The hinge 13, however, must be larger in diameter than then the outside diameter of the pipe 7 or the lock support 5. The swivel mounted hinge will allow easy access to the media blocks 11 when the operator attempts to clean, maintain, or inspect the same.

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons of ordinary skill in the art.

What is claimed is:

1. An apparatus for supporting biofilm media, comprising:
   (a) a first frame comprising rigidly connected members assembled in a shape having a top, a bottom, and a plurality of sides, the plurality of sides having upper members which define the top of the first frame, the plurality of sides further comprise first sides and ends, the upper members of the ends being at a higher level than the upper members of the first sides;
   (b) the bottom and the plurality of sides being reinforced with cross-members so that sheet media may be introduced to the first frame and held within the first frame by the cross-members;
   (c) legs extending downward from the bottom of the first frame; and
   (d) a movable restraining device having a first end and a second end and connected to the frame at the first end.

2. The apparatus of claim 1, wherein the members are selected from the group consisting of rods and pipes.

3. The apparatus of claim 1, wherein the cross-members are members arranged in an X-shape.

4. The apparatus of claim 1, wherein the first frame members are rigidly connected by coupling devices selected from the group consisting of elbow connectors and tee connectors.

5. The apparatus of claim 1, wherein the second end of the movable restraining device makes a removable locking connection with the first frame.

6. The apparatus of claim 1, wherein the legs terminate in feet at a point on the legs furthest from the bottom of the first frame.

7. The apparatus of claim 6, wherein the feet are tee connectors attached to the bottom of the legs.

8. The apparatus of claim 1, further comprising a second frame removably connected to the first frame.

9. The apparatus of claim 8, further comprising a snap lock connecting the first frame to the second frame.

10. The apparatus of claim 1, wherein the first frame further comprises a graspable implement connected to an upper member of an end of the first frame.

11. The apparatus of claim 1, wherein the movable restraining device makes a swivel connection with the first frame at the first end.

12. The apparatus of claim 11, wherein the swivel connection is a hinge.

13. The apparatus of claim 12, wherein the hinge is a sleeve slidingly attached to the first frame and rigidly attached to the movable restraint device.

14. The apparatus of claim 11, wherein the first frame further comprises a lock bar support attached to the upper member of an end of the first frame.

15. The apparatus of claim 14, wherein the second end of the movable restraining device makes a removable locking connection with the lock bar support.

16. The apparatus of claim 14, wherein the swivel connection is made at the lock bar support.

17. An apparatus for supporting biofilm media, comprising:
   (a) a first frame comprising rigidly connected members assembled in a shape having a top, a bottom, and a plurality of sides;
   (b) legs extending downward from the bottom of the first frame;
   (c) cross-members reinforcing the bottom and the plurality of sides such that sheet media may be introduced to the first frame and held within the first frame by the cross-members;
   (d) a graspable implement connected to the top of the first frame;
   (e) a movable restraining device having a first end and a second end and making a swivel connection with the first frame at the first end; and
   (f) a lock bar support attached to the upper member of an end of the first frame, wherein the swivel connection is made at the lock bar support and the second end of the movable restraining device makes a removable locking connection with the first frame.

18. The apparatus of claim 17, wherein the members are selected from the group consisting of rods and pipes.

19. The apparatus of claim 17, wherein the cross-members are members arranged in an X-shape.

20. The apparatus of claim 17, wherein the first frame members are rigidly connected by coupling devices selected from the group consisting of elbow connectors and tee connectors.

21. The apparatus of claim 17, wherein the legs terminate in feet at a point on the legs furthest from the bottom of the first frame.

22. The apparatus of claim 21, wherein the feet are tee connectors attached to the bottom of the legs.

23. The apparatus of claim 17, wherein each of the plurality of sides of the first frame has an upper member.

24. The apparatus of claim 23, wherein the upper members in combination define the top of the first frame.

25. The apparatus of claim 23, wherein the plurality of sides comprise first sides and ends, the upper members of the ends being at a level higher than the upper members of the first sides.

26. The apparatus of claim 17, wherein the swivel connection is a hinge.

27. The apparatus of claim 26, wherein the hinge is a sleeve slidingly attached to the first frame and rigidly attached to the movable restraint device.

28. The apparatus of claim 17, further comprising a second frame removably connected to the first frame.

29. The apparatus of claim 28, further comprising a snap lock connecting the first frame to the second frame.

* * * * *